US00RE42282E

(19) United States
(12) Reissued Patent
Faust et al.

(10) Patent Number: US RE42,282 E
(45) Date of Reissued Patent: Apr. 12, 2011

(54) DEHUMIDIFYING ELEMENT AND MANUFACTURING METHOD FOR THE SAME

(75) Inventors: Stephen Faust, Wesien (DE); Guido Falk, Saarbrücken (DE); Dae-Young Lee, Seoul (KR)

(73) Assignee: Korea Institute of Science and Technology, Seoul (KR)

(21) Appl. No.: 12/698,842

(22) PCT Filed: Dec. 27, 2002

(86) PCT No.: PCT/KR02/02456

§ 371 (c)(1),
(2), (4) Date: Nov. 29, 2004

(87) PCT Pub. No.: WO03/055595

PCT Pub. Date: Jul. 10, 2003

Related U.S. Patent Documents

Reissue of:
(64) Patent No.: 7,326,363
Issued: Feb. 5, 2008
Appl. No.: 10/500,254
Filed: Nov. 29, 2004

(30) Foreign Application Priority Data

Dec. 27, 2001 (DE) ..... 101 64 632

(51) Int. Cl.
*B01J 20/26* (2006.01)

(52) U.S. Cl. ..... 252/194; 96/154
(58) Field of Classification Search ..... 96/108, 96/118, 134, 135, 154; 95/117; 62/94, 271; 252/194
See application file for complete search history.

(56) References Cited

U.S. PATENT DOCUMENTS

| | | | |
|---|---|---|---|
| 3,997,484 | A | 12/1976 | Weaver et al. |
| 4,116,899 | A | 9/1978 | Fanta et al. |
| 4,911,775 | A | 3/1990 | Kuma et al. |
| 5,143,773 | A | 9/1992 | Takuno |
| 5,254,195 | A | 10/1993 | Tseng et al. |
| 5,292,822 | A | 3/1994 | Tanaka et al. |
| 5,753,345 | A | 5/1998 | Kuma |
| 6,080,797 | A | 6/2000 | Nishida |
| 6,265,030 | B1 | 7/2001 | Aronson |
| 2001/0001312 | A1 | 5/2001 | Mitchell et al. |
| 2006/0137530 | A1 | 6/2006 | Yeager et al. |

FOREIGN PATENT DOCUMENTS

| | | | |
|---|---|---|---|
| EP | 0 882 502 | A1 | 12/1998 |
| JP | 8-225610 | A1 | 9/1996 |

OTHER PUBLICATIONS

Heinrich, G., "Sorption–Supported Air Conditioning", 1997.

An office Action of the corresponding Chinese patent application No. 02828323.6 mailed Jun. 2, 2006 (4 pages) with a copy of the English translation thereof (4 pages).

*Primary Examiner*—Frank M Lawrence
(74) *Attorney, Agent, or Firm*—NSIP Law, PC

(57) ABSTRACT

A dehumidifying element includes a super absorbing polymer (SAP), and a hygroscopic base, thereby maintaining hygroscopic characteristics regardless of aging and a high humidity absorbing rate and needing a smaller amount of energy for regeneration.

15 Claims, 3 Drawing Sheets

DEHUMIDIFYING ELEMENT AND MANUFACTURING METHOD FOR THE SAME

Matter enclosed in heavy brackets [ ] appears in the original patent but forms no part of this reissue specification; matter printed in italics indicates the additions made by reissue.

*The present application is a reissue application under 35 U.S.C. § 251 of U.S. patent application Ser. No. 10/500,254, filed Nov. 29, 2004, now U.S. Pat. No. 7,326,363, issued Feb. 5, 2008, which claims priority to International Application No. PCT/KR02/02456, filed Dec. 27, 2002, which claims priority to German Application No. 101 64 632.1-43, filed Dec. 27, 2001, the disclosure of each which is hereby incorporated by reference in its entirety for all purposes.*

TECHNICAL FIELD

The present invention relates to a desiccant, dehumidifying element and a manufacturing method for the same.

BACKGROUND ART

A humidity exchanger element dehumidifies gas by sorption mechanism of the desiccants such as aluminum oxide-silicate or titanium silicate/titanium-aluminum silicate.

According to U.S. Pat. No. 5,505,769, the elements can be included in a sheet composed of inorganic fiber, or can be included in a device formed by the sheet.

However, the conventional humidity exchanger element necessitates regeneration at excessively elevated temperatures (approximately 90~150° C.). In addition, the element has demerits that a sorption capacity thereof is limited and that it causes a large amount of pressure loss of supply air for being dehumidified. Also, a sorption capacity of the humidity exchanger element is decreased over time, that is, the element is greatly influenced by aging.

Also, nucleus and bio-film are formed while the element dehumidifies, thereby closing pores of the humidity exchanger element.

According to G. Heinrich's paper entitled "sorption-supported air-conditioning" published by the C.F. Müller Publishing Company in 1997, the dehumidifying element is made by containing lithium chloride in corrugated cardboard, wherein hygroscopic characteristics of the lithium chloride are used for dehumidifying.

However, The humidity exchanger element containing lithium chloride can not be used in highly humid environment. This is because the lithium chloride tends to liquefy after absorbing the moisture in the air especially in a highly humid condition.

That is, when a solid lithium chloride is changed into a liquid lithium chloride and the cellulose, the carrier thereof, comes to be unable to absorb and maintain the liquid lithium chloride due to its limited sorption capacity, then excessive liquid lithium chloride is dripping away from the element resulting in a reduced content of the lithium chloride in the element.

DISCLOSURE OF THE INVENTION

Therefore, an object of the present invention is to provide a desiccant and a dehumidifying element which shows high humidity absorbing capacity without the aging influence while necessitating a small amount of energy for regeneration and a methods for fabricating the same. To achieve these and other objects and advantages and in accordance with the purpose of the present invention, as embodied and broadly described herein, there is provided a desiccant which has an improved sorption capacity prepared by the ionic modification of a super absorbing polymer (SAP) through contacting it with a salt solution.

There is also provided two methods for fabricating a dehumidifying element. The one method for fabricating a dehumidifying element which consists of a desiccant itself, comprises a step of selecting a salt solution; a step of drying a super absorbing polymer (SAP), a step of contacting the dried SAP with the salt solution; and a step of drying a hydrogel generated by the contact between the SAP and the salt solution.

There is provided another method for fabricating a dehumidifying element which comprises a step of engaging a SAP to a carrier; a step of drying the carrier to which the SAP is engaged; a step of selecting a salt solution; a step of contacting the carrier with the salt solution in order to perform an ionic modification of the SAP; and a step of drying the carrier to which the SAP is engaged.

MODE FOR CARRYING OUT THE PREFERRED EMBODIMENTS

Figure 1:
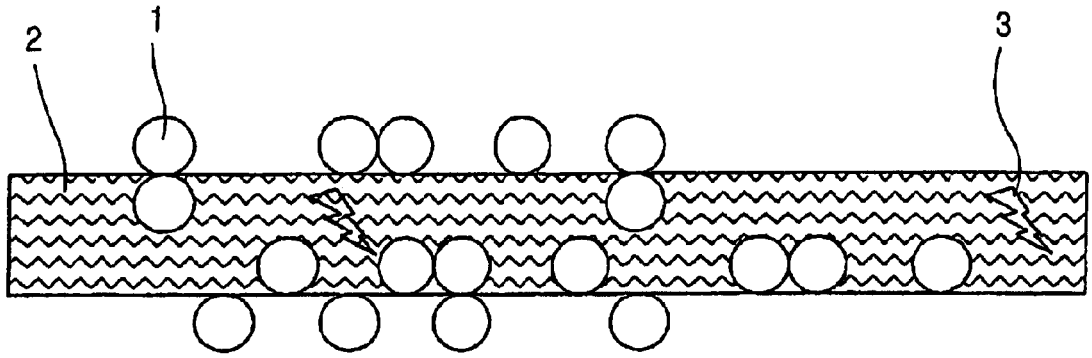
FIG. 1 is a longitudinal sectional view showing a porous carrier including fibers and granules having a super absorbing polymer (SAP), in which the granules are applied to an upper portion thereof.

The present invention will now be described with reference to accompanying drawings.

The desiccant according to the present invention is prepared by the ionic modification of a super absorbing polymer (SAP). The desiccant can absorb more than four times larger amount of the moisture as compared with conventional desiccants such as silica-gels and zeolites. When the relative humidity is 50%, the desiccant can absorb the moisture approximately as much as its dry mass.

A hygroscopic salt such as lithium chloride is used in the ionic modification of the SAP. It has been found that the hygroscopic salt such as lithium chloride has an excellent bonding force with the SAP by substitution of $Na^+$ by $Li^+$).

That is, by the bonding with the SAP, the hygroscopic salt is prevented from weeping after absorbing moisture from the air. At the same time, the hygroscopic characteristics of the SAP are improved enormously by the ionic modification with the hygroscopic salt.

One of the most important finding as in the present invention is that the improvement in the sorption capacity by the ionic modification is strongly dependent upon the concentration of the hygroscopic salt solution. When too high concentration of the salt solution is used in order to allow the SAP to contact with sufficiently large amount of hygroscopic salt ions, the salt solution is found not to be absorbed at all or completely into the SAP. The reason for this is considered that the swelling of the SAP is restrained in a high concentration of the salt solution and thus the amount of the absorbed solution into the SAP is reduced. Consequently, the ionic modification is not performed to a proper extent and the sorption capacity is not improved sufficiently.

On the other hand, if too low concentration of the salt solution is used, the absorbed amount of the salt ions is not sufficiently large even though the SAP absorbs large amount of the liquid solution. As a consequence, the ionic modification thereof is not performed to a proper extent and the sorption capacity is not improved sufficiently.

The hydrogel generated by contacting the SAP with a salt solution can be changed into a proper state capable of absorbing moisture via a step of drying.

In the present invention, the preferable SAPs include polymers and copolymers in which acryl acid and acrylamide are weakly cross-linked, and [propfpolymers] *graft polymers* of starch, cross-linked amylum, and cellulose derivative.

The dehumidifying element including the SAP can be fabricated to have a predetermined shape, can be contained in a container formed of material which permits gas to pass, or can be contained in a porous carrier or attached to an outer surface of the porous carrier. That is, the dehumidifying element can be constructed variously.

The dehumidifying element including the SAP can be formed with granules, and the dehumidifying element formed with the granules is contained in a container through which air passes or fixed on a carrier having a predetermined shape.

In case that the dehumidifying element is formed with granules, a particle diameter of the respective granules is selected in a range of 0.1 μm~10,000 μm; grain fraction in a range of 1 μm~5,000 μm is more preferable, and grain fraction in a range of 20 μm~1,000 μm is most preferable.

The base of the SAP is a water swelling polymer and/or copolymer based on (methyl-)acryl acid, (methyl-)acrylonitrile, (methyl-)acrylamide, vinyl-acetate, vinyl-pyrrolidone, vinyl-pyridine, maleic acid (anhydride), itaconic acid (anhydride), fumaric acid, and vinyl sulfone acid, base, amide, N-alkyl derivative, N,N-dialkyl derivative and five-acid ester which can be polymerized, or natural ingredients such as a product made of rubber, that is, carboxymethyl cellulose, xanthan alginate, gum Arabic, hydroxyethylcellulose, methylcellulose, starch and amylum derivative, and a product of said components combined or partially cross-linked.

When the dehumidifying element including the SAP is realized as fibers, it can be used in many fields. Especially, if the porous carrier includes the dehumidifying element including the SAP, the dehumidifying element can be realized as a textile, meshed textile, knitted fabric, knit, or bonded fabric. It is also possible to combine the aforementioned embodiments of the porous carrier.

Methods for providing the dehumidifying element including the SAP in the carrier or on a surface of the carrier include a method for coating the dehumidifying element on the porous carrier or a method for inserting the dehumidifying element in the porous carrier.

Preferably, by realizing the porous carrier as a fiber composite formed of natural fiber and artificial fiber, humidity carrying characteristics of the natural fiber and mechanical characteristics of the porous carrier formed by the artificial fiber can be improved.

The porous carrier can be formed with a single layer or multiple layers, or can be flat or structured. Herein, if the porous carrier is formed with one or plural sheets, it is formed as a dehumidifying body along the periphery of which air flows along, or which air passes through. More preferably, the sheet is structured by forming a wave-shape of the sheet as a trapezoid or a triangle in a horizontal sectional surface. Then, plural and smooth sheets are arranged in such a method that spatial 3-dimensional channels are generated. Through the channels, air from which humidity will be removed is guided.

Then, the hygroscopic characteristics of the element fabricated in the 3-dimension shape can be realized by selecting the salt solution. Regardless of the realization form that the SAP takes a granular form or the SAP is included in the carrier, by drying the SAP at first, the SAP can absorb the salt solution much more. According to this, the SAP can be contacted to the hygroscopic salt. The SAP is provided with the hygroscopic salt by contacting the salt solution with the SAP. The hydrogel generated by contacting the granules with the salt solution or SAP is dried, thereby being converted into a state capable of absorbing moisture.

When the granules of the SAP is engaged to each other and forms large agglomeration, it is preferable that the agglomeration of the SAP is crushed to pieces and the granules are classified before contacting with the salt solution. According to this, uniform characteristics of the element can be realized. Likewise, if the SAP is engaged to each other and forms large agglomeration after the step of final drying, it is also desirable that the agglomeration of the modified SAP is crushed to pieces and the granules are classified.

Another method for fabricating a dehumidifying element with an SAP desiccant modified ionically is making contact the carrier including the SAP with a salt solution.

If the carrier including the SAP is contacted to the salt solution, dried slowly, and the drying temperature is increased slowly, an adequate regeneration is possible and the salt solution is excellently absorbed by the SAP. On the contrary, it has been observed that the salt is extracted from the surface of the carrier instead of being absorbed perfectly into the SAP when the regeneration temperature is increased fast to level.

The most important in the preparation of the desiccant is to select the concentration of the salt solution between 5-15 wt %. In case of using the salt solution of the concentration between 5-15 wt %, the sorption capacity of the modified SAP can be optimized between the restrictions in the liquid sorption capacity and in the highest concentration of the salt solution. That is, the hygroscopic salt of the maximum amount can be contacted to the SAP by selecting the salt concentration between 5-15 wt %, or more preferably as 10 wt %. The reason is that the salt solution cannot be absorbed properly into the SAP in case of using too high concentrated solution due to the inherent characteristics of the SAP restraining itself from swelling in high ion density, and that the salt ions are not absorbed sufficiently into the SAP in case of using too low concentrated solution due to the limitation on the liquid sorption capacity of the SAP.

When the carrier including the SAP of a granular form is contacted with the salt solution, if the absorption capacity for the salt solution of the SAP is very high, the granule particles tend to be agglomerated to form a large lump after a step of drying. Therefore, it is preferred that the carrier is contacted with the salt solution in several steps. At this time, at each step, the carrier is partly contacted with the salt solution, and the contact is realized by drizzling, sprinkling, spraying, etc.

Preferred Embodiment

FIG. 1 is a longitudinal sectional view of the dehumidifying element according to the present invention.

As shown in FIG. 1, the dehumidifying element of the present invention is composed of a porous carrier 2 to the surface or the inside of which SAP is attached. The SAP is formed in the porous carrier or at a surface thereof as granular particles 1.

The granular particles 1 include the SAP, and the SAP is contacted to a hygroscopic base (not shown). At this time, the carrier 2 consists of fiber composed of natural or composite polymer and a filament. Further, the carrier 2 includes fibers 3 containing the SAP therein, in which the fibers 3 are inserted into the porous carrier 2. The fibers 3 are contacted to the hygroscopic base in a finely distributed form like the granules 1, and can be applied to a surface of the porous carrier 2.

A particle diameter of the granules 1 is approximately identical for all granular particles and is in a range of 20 μm~1,000 ~m. Less preferably, but always suitably, a diameter of grain fraction is in a range of 1 ~m~5,000 μm, in which particles of 20 μm~1,000 μm are basically considered. The SAP forming the granules includes polymer and copolymer in which acryl acid and acrylamide are weakly cross-linked, and amylum and cellulose derivatives corresponding to [propfpolymer] *graft polymer* of starch and cross-linked.

Also, the granules 1 having a hygroscopic base as a finely distributed shape can form the carrier itself without an additional carrier and perform a dehumidifying function. Also, the granules 1 can be applied on the surface of the porous carrier 2 by coating and included in the porous carrier 2. Also, in case that the porous carrier 2 is a fiber composite, the SAP can be integrated in the carrier 2 as a part of the fibers.

The fiber composite is a matrix and includes natural fibers or one or plural artificial fiber materials corresponding to reinforcing fibers. The artificial fiber material improves mechanical characteristics of the porous carrier 2 or the fiber composite, and the natural fiber carries humidity better.

Also, the natural fiber stores its humidity, that is, water vapor, water or aqueous solution. The porous carrier composed of fiber or filament includes textile, meshed textile, knitted fabric, knit, a combination therebetween, bonded fabric, etc.

The SAP is contacted to the hygroscopic base by soaking a water-based solution of the hygroscopic base into the granules of the SAP or the SAP fibers, drizzling, sprinkling or by other methods. Herein, the SAP absorbs the salt solution by its own absorption characteristics.

As a modification method, the modification of the SAP, in other words, contacting the SAP with the salt solution, the SAP can be modified before the granules of the SAP or the SAP fibers are included in the carrier or at a surface of the carrier, or can be modified after the SAP granules or the SAP fibers are already included in the carrier or at the surface of the carrier.

If the porous carrier is modified in several fabrication steps, structured, or arranged, the modification of the SAP and the salt solution can be performed at any fabrication step in consideration with a time point of the most preferable modification.

In order to modify the SAP granules or the SAP fibers, first of all, the salt solution has to be selected. The salt solution includes a strong hygroscopic base such as lithium chloride, magnesium chloride, calcium chloride, or lithium bromide, and includes water as solvent.

The salt solution is completely desalinated, deionized, and distilled, wherein a base concentration is 5~15 wt % and a maximum concentration is 15 wt %.

In order to maintain the residual content of the moisture in the SAP to a minimum extent and thus to allow the SAP to absorb the salt solution as much as possible in contacting with the salt solution afterwards, it is necessary that the granules or fibers be dried completely before contacting with the salt solution. For this purpose, a vacuum drier can be used preferably. The vacuum drier exerts very small thermal influence on the granules at the time of drying, thereby preventing a stability depreciation by temperature change through a long term view.

Then, the dried SAP granules are modified ionically by the salt solution, and can be variously processed. For example, the SAP granules can be provided in the salt solution or the solution can be added to the granules.

After the ionic modification, the hydrogel generated from the SAP granules is dried, thereby regenerating the granules. The hydrogel can be layered on a plate as thin as possible thereby restricting the formation of the lump in the step of drying. In case of lump formation, it is necessary to crush the lump. It is suitable to use an impact crusher or a breaker for this end.

When the SAP granules or the SAP fibers are located within the carrier or thereon, in order to perform an ionic modification of the SAP, firstly it is required for the carrier including the SAP to be dried, thereby reducing the amount of the water contained therein to a minimum extent. And the selection of the salt solution is carried out similar to the aforementioned methods.

When the porous carrier 2 including the SAPs 1 and 3 is contacted with the salt solution, it would be better to contact in multistage plural times between the porous carrier 2 and the salt solution. The reason is that the granular particles 1 can be engaged and agglomerated into a lump in or on the porous carrier 2. Although it is possible to crush a lump formed through an ionic modification of the SAP itself, it would be impossible to crush a lump formed through an ionic modification of a SAP engaged into a carrier. Therefore, it is important to restrict the generation of the lump in a step of contacting the carrier containing the SAP with the salt solution. The solution can be prudently contacted with the carrier including the SAP in multistage by drizzling, sprinkling, or spraying.

Finally, the carrier 2 including the SAP is dried slowly, wherein the drying temperature is gradually increased through the drying process until it rises to the maximum regeneration temperature.

This step of slowly drying of the carrier 2 including the SAP by slowly increasing the temperature causes to maintains the structure of the modified SAP. That is, the SAP is not decomposed. The drying method includes a freeze drying, a microwave drying, a normal drying, or a combination drying therebetween.

A method for fabricating the dehumidifying element, which is formed to increase the contact area with air, with modified SAP granules or the modified SAP fiber can be properly performed. The structure of the porous carrier, as shown in FIGS. 2 and 3, includes a trapezoid wave shape as a structured sheet, and at the same time, a sheet of a corrugated reed shape has a ripple of 2.5~7 mm, an interval length (a), a ripple of 1~5 mm, and a wave height (b).

The forming is attained by an embossing process using a rippling or a stamping in heat reaction at a 180° C. temperature.

Figure 2:
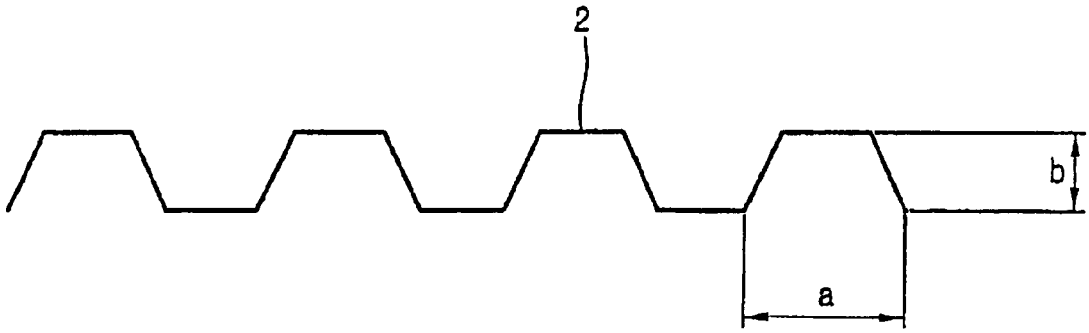
FIG. 2 is a longitudinal sectional view of a porous carrier having a wave shape of a trapezium and formed by a structured sheet.
Figure 3:
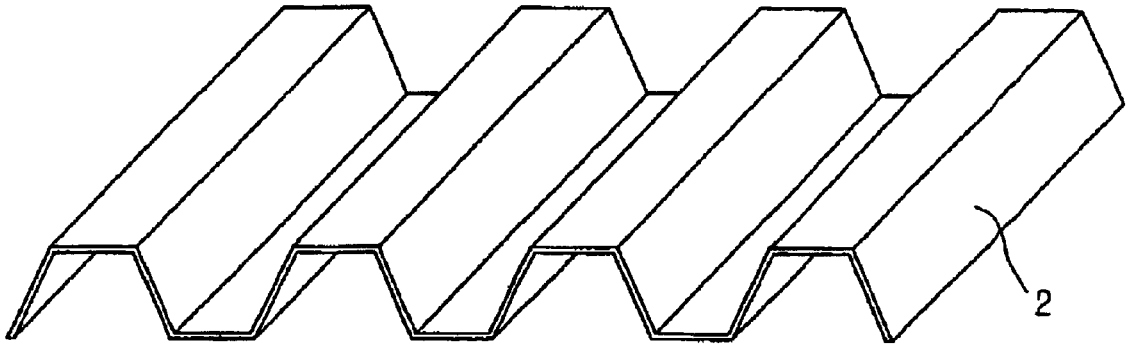
FIG. 3 is a perspective view of the porous carrier of FIG. 2.
Figure 4A:
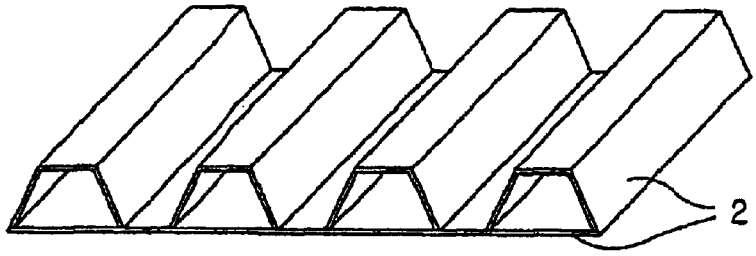
FIGS. 4A, 4B, and 4C are schematic views showing methods by which three dimensional channels are generated in which the plural porous carriers are structured and/or flat sheets are arranged.
Figure 4B:
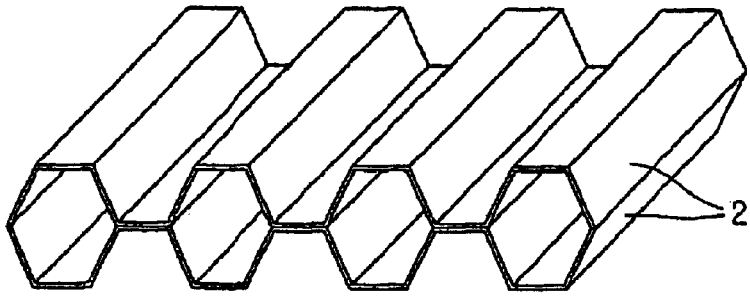
Figure 4C:
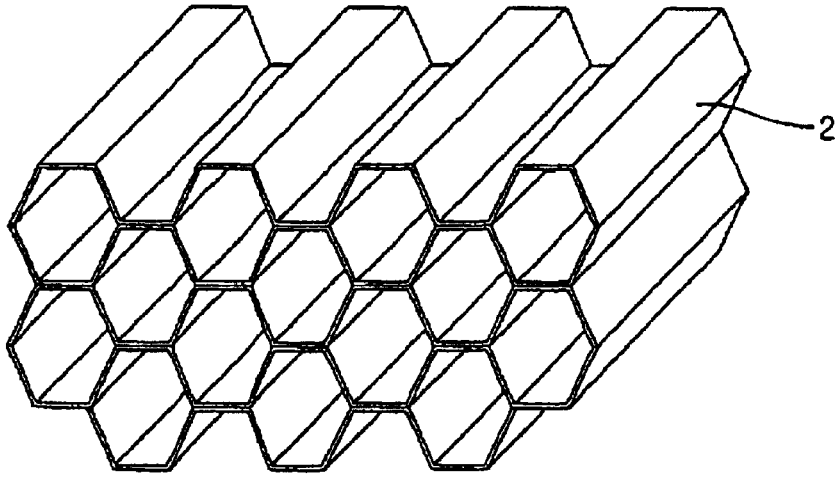

FIGS. 4A, 4B, and 4C are schematic views showing the respective embodiments in which the plural sheets according to FIGS. 1 and 2 are arranged by a method such that 3-dimensional channels are generated.

The channels permit gas from which the humidity will be removed, for example, air, to penetrate or to flow at the periphery.

In FIG. 4A, one structure is generated by a combination between flat sheets and shaped sheets. The structure is coiled to the dehumidifying body simply or laminated, thereby properly being arranged like a general humidity exchanging body.

FIG. 4B shows two sheets structured as a trapezoid. The sheets form a honeycombed structure, and form 3-dimensional channels like in FIG. 4A. Through the channels, gas from which humidity will be removed can flow.

FIG. 4C illustrates a plurality of layers according to the arrangement of FIG. 4B, by which a dehumidifying body having 3-dimensional channels can be formed.

Regardless of the point in time of the ionic modification, that is, regardless of whether the SPA granules or the SAP fiber is contacted to the hygroscopic base or not, whether the SPA granules or the SAP fiber is contacted to the hygroscopic base with a location in the porous carrier or thereon or not (FIG. 1), or whether the modification is started after the porous carrier passes several transformation steps or not (FIGS. 3, 4B, and 4C), lithium chloride adjacent on the surface of the SAP permits not only water to be added but also water to be guided inside of the superabsorber.

At this time, preferably, on one hand, the base is spontaneously regenerated as water is guided into the superabsorber. And, on the other hand, humidity is removed into the superabsorber and thus does not remain on the surface any longer.

INDUSTRIAL APPLICABILITY

As so far described, according to the dehumidifying element and the method for fabricating the same, hygroscopic characteristics regardless of aging and high humidity absorbing rate are maintained and a small amount of energy for regeneration is required.

The invention claimed is:

1. A method of preparing a desiccant comprising the steps of:

selecting a *hygroscopic* salt solution;

drying a super absorbing polymer (SAP);

contacting the dried SAP with the salt solution[in order to perform an ionic modification of the SAP]; and drying a hydrogel generated by the contact between the SAP and the salt solution,

*wherein the SAP comprises an acryl acid cross-linked with at least one of acrylamide, starch, and cellulose.*

2. The method of claim 1, wherein the concentration of the *hygroscopic* salt solution is between 5-15 wt %.

3. The method of claim 1, wherein the *hygroscopic* salt solution comprises water as a solvent.

4. A method of making a dehumidifying element comprising the steps of:

engaging a SAP to a carrier;

drying the carrier to which the SAP is engaged;

selecting a *hygroscopic* salt solution;

contacting the carrier with the *hygroscopic* salt solution in order to perform an ionic modification of the SAP; and drying the carrier to which the SAP is engaged.

5. The method of claim 4, wherein the concentration of the *hygroscopic* salt solution is between 5-15 wt %.

6. The method of claim 4, wherein the *hygroscopic* salt solution comprises water as a solvent.

7. The method of claim 4, wherein the carrier is contacted with the *hygroscopic* salt solution by soaking or spraying the salt solution into the carrier.

8. The method of claim 4, wherein the step of contacting the carrier with the *hygroscopic* salt solution is repeated.

*9. The method of claim 4, wherein the SAP comprises an acryl acid cross-linked with at least one of acrylamide, starch, and cellulose.*

*10. A method of preparing a desiccant comprising the steps of:*

*selecting a hygroscopic salt solution;*

*drying a super absorbing polymer (SAP);*

*contacting the dried SAP with the salt solution; and*

*drying a hydrogel generated by the contact between the SAP and the salt solution,*

*wherein a base of the SAP comprises an acryl acid cross-linked with at least one of acrylamide, starch, and cellulose.*

*11. A method of preparing a desiccant comprising the steps of:*

*selecting a hygroscopic salt solution;*

*drying a super absorbing polymer (SAP);*

*contacting the dried SAP with the salt solution; and*

*drying a hydrogel generated by the contact between the SAP and the salt solution,*

*wherein the SAP comprises an acryl acid and an acrylamide that are cross-linked, and graft polymers of at least one composition selected from the group consisting of starch, cross-linked amylum, and cellulose derivative.*

*12. A method of preparing a desiccant comprising the steps of:*

*selecting a hygroscopic salt solution;*

*drying a super absorbing polymer (SAP);*

*contacting the dried SAP with the salt solution; and*

*drying a hydrogel generated by the contact between the SAP and the salt solution,*

*wherein the SAP comprises an acryl acid and an acrylamide that are cross-linked, and a graft polymer of starch cross-linked and corresponding to amylum and cellulose derivatives.*

*13. The method of claim 4, wherein a base of the SAP comprises an acryl acid cross-linked with at least one of acrylamide, starch, and cellulose.*

*14. The method of claim 4, wherein the SAP comprises an acryl acid and an acrylamide that are cross-linked, and graft polymers of at least one composition selected from the group consisting of starch, cross-linked amylum, and cellulose derivative.*

*15. The method of claim 4, wherein the SAP comprises an acryl acid and an acrylamide that are cross-linked, and a graft polymer of starch cross-linked and corresponding to amylum and cellulose derivatives.*

* * * * *